United States Patent
Aggarwal et al.

(10) Patent No.: US 11,726,792 B1
(45) Date of Patent: Aug. 15, 2023

(54) METHODS AND APPARATUS FOR AUTOMATICALLY TRANSFORMING SOFTWARE PROCESS RECORDINGS INTO DYNAMIC AUTOMATION SCRIPTS

(71) Applicant: EYGS LLP, London (GB)

(72) Inventors: Ajitabh Aggarwal, Haryana (IN); Ashish Kumar, Uttar Pradesh (IN)

( * ) Notice: Subject to any disclaimer, the term of this patent is extended or adjusted under 35 U.S.C. 154(b) by 0 days.

(21) Appl. No.: 18/158,896

(22) Filed: Jan. 24, 2023

(51) Int. Cl.
- *G06F 9/46* (2006.01)
- *G06F 9/44* (2018.01)
- *G06F 9/38* (2018.01)
- *G06F 16/25* (2019.01)

(52) U.S. Cl.
CPC .......... *G06F 9/3879* (2013.01); *G06F 16/254* (2019.01)

(58) Field of Classification Search
CPC ............................ G06F 9/3879; G06F 16/254
See application file for complete search history.

(56) References Cited

U.S. PATENT DOCUMENTS

| | | | |
|---|---|---|---|
| 2009/0217302 A1* | 8/2009 | Grechanik | G06F 11/3684 719/320 |
| 2009/0217309 A1* | 8/2009 | Grechanik | G06F 11/3692 719/328 |
| 2021/0109487 A1 | 4/2021 | Iyer et al. | |
| 2021/0133078 A1 | 5/2021 | Kunnath et al. | |
| 2022/0066422 A1 | 3/2022 | Kunnath et al. | |

OTHER PUBLICATIONS

Santosh Kumar Swain et al., Test Case Generation Based on Use Case and Sequence Diagram, Jul. 2010, [Retrieved on Mar. 21, 2023], Retrieved from the internet: <URL: https://www.researchgate.net/profile/Rajib-Mall/publication/45363457_Test_Case_Generation> 32 Pages (21-52) (Year: 2010).*

Nazanin Kadivar et al., Capturing and Supporting the Analysis Process, Oct. 12-13, 2009, [Retrieved on Mar. 21, 2023], Retrieved from the internet: <URL: https://ieeexplore.ieee.org/stamp/stamp.jsp?tp=&arnumber=5333020> 8 Pages (131-138) (Year: 2009).*

* cited by examiner

*Primary Examiner* — Anibal Rivera
(74) *Attorney, Agent, or Firm* — Cooley LLP

(57) ABSTRACT

An apparatus includes a processor and a memory storing instructions to cause the processor to receive files including a table database and sequence record data. The processor is further caused to generate a script by mapping each screen feature from a set of screen features extracted from the sequence record data to a table from the table database. The processor is further caused to generate a screen schema based on the script, by attempting to correlate addresses associated with the sequence record data to the screen features, to generate the screen schema including a table of dynamic. The processor is further caused to automatically generate a generic automation script based on the sequence record data and the screen schema to be consumed by a software bot to execute user actions in the sequence record data in an automated fashion.

20 Claims, 6 Drawing Sheets

METHODS AND APPARATUS FOR AUTOMATICALLY TRANSFORMING SOFTWARE PROCESS RECORDINGS INTO DYNAMIC AUTOMATION SCRIPTS

FIELD

The present disclosure generally relates to the field of data conversion for automation software. In particular, the present disclosure is related to methods and apparatus for automatically transforming software process recordings into dynamic automation scripts.

BACKGROUND

Businesses oversee thousands of operations and customer relations that can easily become overwhelmingly complex and inefficient. Enterprise software can enable businesses to manage such operations and relations through various automated software systems, applications, and data processing products. For example, tasks including data migration, reading data, processing data, transferring data, verifying data, and/or the like, can possibly be improved or optimized through automated processing. Although enterprise software can typically handle information overload and perform complex and repetitive tasks, automating such tasks can be often complex and difficult to navigate efficiently.

In many business processes and/or operations run by enterprise software, the enterprise software can commonly perform multiple repetitive tasks such as, for example, running test scripts, data upload and management, user access related activities, and/or the like. Extensive usage of automation tools for such processes can be difficult and time consuming to implement. Thus, a need exists to automate conversion of business processes to scripts readable by software executing bots without relying on complex automation tools.

SUMMARY

In one or more embodiments, an apparatus includes a processor and a memory operatively coupled to the processor. The memory stores instructions to cause the processor to receive files including a table database and sequence record data. The instructions further cause the processor to extract screen features associated with user actions from the sequence record data and map each screen feature to a table from the table database based on a sequence identifier, to generate a script. The instructions further cause the processor to generate a merged address tree including a set of addresses associated with the sequence record data. The instructions further cause the processor to generate a screen schema based on the script, by converting each address from the merged address tree into a dynamic address and associated with each screen feature to a dynamic address, to produce a table of dynamic addresses. The instructions further cause the processor to automatically generate a generic automation script based on the sequence record data and the screen schema. The generic automation script is configured to be executed by a software bot.

In one or more embodiments, a non-transitory, processor-readable medium stores instructions to cause a processor to receive files including a table database and sequence record data. The instructions further cause the processor extract screen features associated with user actions from the sequence record data and map each screen feature to a table from the table database based on a sequence identifier, to generate a script. The instructions further cause the processor to receive a set of address files associated with the sequence identifier. The instructions further cause the processor to generate a merged address tree by removing redundant addresses from the set of address files. The redundant addresses include duplicate addresses shared within the set of address files. The instructions further cause the processor to attempt to correlate each line in the sequence record data to each address from the merged address tree, to identify a path for each screen feature from the script based on a hierarchy of screen features. The instructions further cause the processor to convert each address associated with each path to a dynamic address from a table of dynamic addresses, to generate a screen schema. The instructions further cause the processor to map a pre-defined control from a set of pre-defined controls to a user action from a set of user actions associated with the sequence record data, to produce set of mapped controls, The instructions further cause the processor to assign each mapped control to each dynamic address from the table of dynamic addresses of the screen schema and associated with each user action, to generate a generic automation script.

In one or more embodiments, an apparatus includes a processor and a memory operatively coupled to the processor. the memory stores instructions to cause the processor to receive files including a script and sequence record data. The instructions further cause the processor to generate a screen schema based on the script. The screen schema includes a table of dynamic addresses associated with the sequence record data. The instructions further cause the processor to automatically generate a generic automation script from the screen schema based at least on a sequence identifier by mapping a pre-defined control from a set of pre-defined controls to a user action from a set of user actions associated with the sequence record data. The instructions further cause the processor to transmit the generic automation script to a software bot to be executed. The instructions further cause the processor to automatically receive a command to generate, at runtime, a data file based on the execution of the generic automation script by extracting field data from the files based on the sequence identifier. The field data is used to execute a sequence of user actions recorded in the sequence record data, to verify that the generic automation script is associated with the sequence record data.

DETAILED DESCRIPTION

Figure 1:
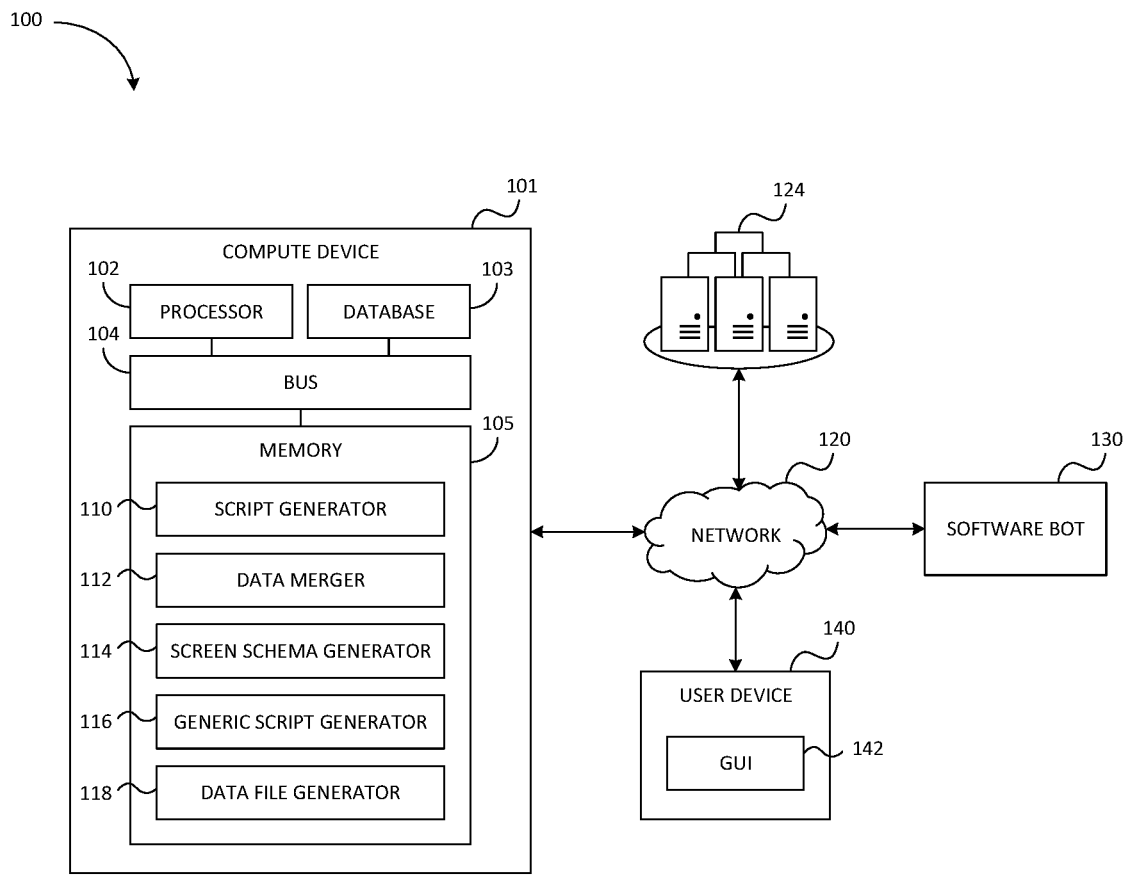
FIG. 1 is a diagrammatic illustration of a system for automatically transforming software process recordings into dynamic automation scripts, according to an embodiment.

Some embodiments can include an apparatus that automatically converts automated processes to a generic automation script in a format compatible for software robots (also referred to herein as "software bots") to execute. In some implementations, certain processes, operations, and/or relations can be executed and/or managed using enterprise software, such as, for example, enterprise resource planning (ERP). In some cases, the enterprise software can be or include Systems Applications and Products in Data Processing (SAP) software. SAP software can implement a screen that users can use to perform specific tasks and/or processes. A "screen" can refer to a graphical user interface (GUI) element (or a front end user interface) that enables a user to interact with SAP software to generate and/or perform tasks and/or processes such as, for example, facilitating new sales order, display customer information, perform a financial transaction, and/or the like. The screen can be used to display information and allow users to enter and manipulate data. In some implementations, screens can be combined into sequences of screens. The screen can include screen flow logic that can call computer modules, to prepare the screen for display (as a window) on a GUI and/or to process user entries. In some implementations, the screen can include screen features, such as, for example, output fields, input fields, buttons, checkboxes, radio buttons, list boxes, identifiers, menu bar, toolbar, and/or other types of controls. In some cases, the screen features can be organized into various screen layouts to define the arrangement and behavior of the screen features on the screen. In some instances, screens can be accessed through transactions via SAP software that can be, for example, code names that represent business processes/tasks within the SAP software. The business process/tasks can be recorded into SAP recordings (e.g., sequence record data).

The apparatus can convert SAP recordings typically run on SAP software into an automated script such as, for example, a robotic processing automation (RPA) scripts to be used by software bots. An RPA script can be a software script to automate repetitive, rules-based tasks that are typically performed by humans. The RPA scripts can be, for example, sets of instructions that tell an RPA tool, such as, for example, a software bot, what tasks to perform and how to perform them. In some cases, the tasks can include, for example, data entry, document processing, and/or other routine tasks which can be time-consuming and prone to errors when performed manually. In some cases, RPA scripts can be generated using automation tools such as, for example, UiPath® Orchestrator. The apparatus can enable users to generate RPA scripts directly using SAP recordings without using and/or mastering UiPath® Orchestrator. In some implementations, the apparatus can integrate ERP software including SAP software to record SAP transactions and convert the SAP transactions to RPA scripts (or scripts that are compatible with RPA tools such as the software bot) without using UiPath® Orchestrators and/or any other automation tool. In some instances, processes executed on SAP programs can have multiple repetitive tasks. The apparatus can generate RPA scripts using existing (e.g., previously-executed) SAP programs to efficiently automate SAP processes.

Some embodiments of the apparatus can enable users to create (define) UiPath® files directly using SAP recordings. The apparatus can eliminate a need to re-record an entire process(es) by enabling users to directly change data mapping files. The apparatus can include software tools that create (define) files and scripts in bulk to be used by RPA software bots automatically. In some implementations, the apparatus can facilitate automatic data creation concurrently with other processes to enable multiple users to use software bots. The apparatus can use SAP recordings that can enable users to record any software process of any business process for various applications. The apparatus can record on any standard of SAP software and use SAP recordings of business processes to generate RPA scripts that can run on any computer systems that use SAP software.

The apparatus can include a screen/GUI with scripting features, enabling users to generate scripts compatible with software bots using SAP recordings. The scripting features can be categorized, for example, into several tools: a script generation tool, a screen schema generation tool, an Extensible Application Markup Language (XAML) generation tool, and a data identification and mapping tool. The tools can be used by users to interact with SAP software on the GUI. Each tool can be presented onto on the GUI as a screen containing screen features to enable users to provide inputs and/or receive outputs.

At the script generation tool, the apparatus can generate a script that maps screen features from a recording file (e.g., an SAP recording) to a corresponding table from a table database. The recording file (also referred to herein as "sequence record data") can be a file including a software process of executing a sequence of actions. The recording file can also be, for example, a record of a sequence of actions, business transactions, and/or processes. In some implementations, the recording file can be used to document and track a sequence of actions taken during a business process, such as, for example, a financial transaction, a sales order, a customer service request, and/or the like. In some implementations, the business process can be or include a software process. For instance, the business process can include performing a sales order. The software process associated with that business process can include a sequence of actions involved in performing that sales order of the via a compute device such as, for example, inputting data on input fields, clicking a button, selecting an item on a dropdown menu, and/or the like. The recording file can include screen features such as, for example, fields, input fields, buttons, checkboxes, radio buttons, list boxes, identifiers, and/or other types of controls. The screen features can also include screen fields (e.g., inputs and outputs) for the screen features such as, for example, username, password, and/or the like. For instance, the recording file can include information about interactions by a user with the screen features during the sequence of actions of the business process. The table database can include a list of tables of sequences of data previously generated, stored, and/or the like. In some implementations, the apparatus can generate the script by extracting information (e.g., inputs and outputs) from the sequence record data specified by a sequence identifier (e.g., a process code) and mapping the extracted information to tables specified by the sequence identifier from the table database to generate the script in a format (e.g., CSV format).

The apparatus can also collate addresses from address files generated by SAP software. The addresses from the address files can be unstable as the format of the addresses can be incompatible to be consumed by the screen schema generation tool (and the software bot) and also include duplicate addresses. The apparatus can compress the address files to generate a merged file that includes a merged address tree. The merged address tree can include addresses structured in a hierarchy based on a configuration of screen features rendered/processed (e.g., chronologically) in the sequence recording data.

At the screen schema generation tool, the apparatus can generate a screen schema by attempting to correlate each line in the sequence record data to each address from the merged address tree, to identify a path for each screen feature from the script based on the hierarchy of the of screen features. The apparatus can further convert each address from the merged address tree into dynamic addresses without compromising stability of the screen schema. For instance, addresses generated by SAP software can be prone to errors as it can be dependent on a version of the GUI used to generate address files. In some cases, a GUI with version 7.50 can differ from a GUI with version 7.60. In some implementations, the apparatus can insert a generic character such as, for example, "x" at the end of an address from the merged address tree to generate (or convert an address from the merged address tree) a dynamic address. The generic character can inform the screen schema generation tool to use that address in response to any changes to a name for that address (based on SAP software updates, tool updates, GUI version updates, etc.). In some cases, the apparatus can replace specific address characters with the generic character. The screen schema can include a table of dynamic addresses organized in a hierarchy based on an identifier for each selector in the table of dynamic addresses. Each selector can be unique to and/or associated with each screen feature in the script and/or extracted from the sequence record data. In some cases, a selector can be a dynamic address and can contain information necessary to identify screen features in the GUI and can link the dynamic address to a corresponding a screen field in the script generated at the script generation tool. In some cases, the selector and dynamic address can be used interchangeably. In some cases, the table of dynamic addresses can be viewed as future-ready addresses for screen features affected by changes via updates. Each dynamic address can in a format (e.g., XAML format) that is consumable and/or readable by software bots.

At the XAML generation tool, the apparatus can automatically generate a generic automation script in a format (e.g. XAML format) to be consumed by a software bot to execute a sequence of actions (e.g., business process, task, etc.) specified by the sequence record data. In some implementations, the generic automation script can be a XAML file which can be in a format compatible for consumption by an RPA tool such as, for example, the software bot. At the XAML generation tool, the apparatus can map a pre-defined control from a set of pre-defined controls to a user action from a set of user actions associated with the sequence record data, to produce a set of mapped controls. For instance, the user action can be clicking on a screen. The pre-defined control can be a button press mapped to the user action of clicking on a screen. The mapped control can be clicking (by the software bot) the button on the screen. The apparatus can assign each mapped control from the set of mapped controls to each dynamic address from the table of dynamic addresses, to generate the generic automation script. As such, when the software bot consumes the generic automation script for execution, the software bot can automatically click the button.

At the data identification and mapping tool, the apparatus can automatically generate and/or identify data files to be used as inputs (for screen fields) to test that the generic automation script generated for automating the business process specified in the sequence record data is accurate. For instance, the apparatus can extract screen fields (e.g., inputs) from a set of files including the script to use as inputs for future sequences of actions (e.g., business processes, tasks, etc.) to be automatically executed by the software bot. In some cases, the data files can be stored in a database at a server such that the software bot can retrieve the data files to use as inputs (for generating generic automation scripts) to be used to automatically execute sequences of actions). In some implementations, the apparatus can generate the data files automatically and/or at runtime.

FIG. 1 is a diagrammatic illustration of a system 100 for automatically transforming software process recordings into dynamic automation scripts, according to an embodiment. The system 100 includes a compute device 101, a server 124, a software bot 130, a user device 140, and a network 120 configured to enable communication between the compute device 101, the server 124, the user device 140, and/or the software bot 130. The compute device 101 can include a processor 102, a bus 104, a database 103, and a memory 105 operatively coupled to the processor 102. The database 103 can be a local database, a cloud database, a copy of a database, a data management system, and/or the like. The database 103 can store any data received by the processor 102 and/or generated by the processor 102. In some implementations, the database 103 can be a copy of a database located at the server 124.

The software bot 130 can be or include a software agent configured to execute tasks in an automated fashion such as, for example, data entry, scheduling, customer service, media management, monitoring and alerting, repetitive tasks, engaging in dialogue, migrating data, compressing data, parsing data, and/or the like. In some implementations, the software bot 130 can be or include a chatbot. In some implementations, the software bot 130 can be a digital entity located at a compute device such as, for example, the compute device 101, a remote compute device (e.g., the user device 140), and/or any external device. In some implementations, the software bot 130 can be or include an execution host that runs processes built in a program such as, for example, UiPath® Studio and/or UiPath® Orchestrator.

The server 124 can be or include a cloud server that the compute device 101, the software bot 130, and/or the user device 140 can operate on. In some implementations, the compute device 101 can be located at the server 124 and generate generic automation scripts at the server 124 and transmit signals representing the generic automation scripts to the software bot 130 and/or any other remote compute device that includes software bots. In some implementations, the compute device 101 can be any remote compute device and/or operated on the network 120 and connected to the server 124. The processor 102 and a memory 105 communicate with each other, and with other components, via a bus 104. The bus 104 can be any of several types of bus structures including, for example, a memory bus, a memory controller, a peripheral bus, a local bus, and/or any combination thereof, using any of a variety of bus architectures. The compute device 101 can be or include, for example, a computer workstation, a terminal computer, a server computer, a handheld device (e.g., a tablet computer, a smartphone, etc.), and/or any machine capable of executing a sequence of instructions that specify a user action to be taken by that machine, and/or any combinations thereof. The compute device 101 can also include multiple compute devices that can be used to implement a specially configured set of instructions for causing one or more of the compute devices to perform any one or more of the aspects and/or methodologies described herein.

The compute device 101 can include a network interface (not shown in FIG. 1). The network interface can be used for connecting the compute device 101 to one or more of a variety of networks including, for example, the network 120, and one or more remote compute devices connected thereto (e.g., the server 124, the software bot 130, etc.). The network 120 can be or include, for example, a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 120 can be a wireless network such as, for example, a Wi-Fi® or wireless local area network ("WLAN"), a wireless wide area network ("WWAN"), and/or a cellular network. In other instances, the network 120 can be a wired network such as, for example, an Ethernet network, a digital subscription line ("DSL") network, a broadband network, and/or a fiber-optic network. In some instances, the compute device 101 can use Application Programming Interfaces (APIs) and/or data interchange formats (e.g., Representational State Transfer (REST), JavaScript Object Notation (JSON), Extensible Markup Language (XML), Simple Object Access Protocol (SOAP), and/or Java Message Service (JMS)). The communications sent via the network 120 can be encrypted or unencrypted. In some instances, the network 120 can include multiple networks or subnetworks operatively coupled to one another by, for example, network bridges, routers, switches, gateways and/or the like.

The processor 102 can be or include, for example, a hardware-based integrated circuit (IC), or any other suitable processing device configured to run and/or execute a set of instructions or code. For example, the processor 102 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 102 can be configured to run any of the methods and/or portions of methods discussed herein.

The memory 105 can be or include, for example, a random-access memory (RAM), a memory buffer, a hard drive, a read-only memory (ROM), an erasable programmable read-only memory (EPROM), and/or the like. In some instances, the memory can store, for example, one or more software programs and/or code that can include instructions to cause the processor 102 to perform one or more processes, functions, and/or the like. In some implementations, the memory 105 can include extendable storage units that can be added and used incrementally. In some implementations, the memory 105 can be a portable memory (e.g., a flash drive, a portable hard disk, and/or the like) that can be operatively coupled to the processor 102. In some instances, a remote database device can serve as a memory and be operatively coupled to the compute device 101. The memory 105 can include various components (e.g., machine-readable media) including, but not limited to, a random-access memory component, a read only component, and/or any combinations thereof. In one example, a basic input/output system (BIOS), including basic routines that help to transfer information between components within the compute system 101, such as during start-up, can be stored in memory 105. The memory 105 can further include any number of program modules including, for example, an operating system, one or more application programs, other program modules, program data, and any combinations thereof.

In some implementations, the memory 105 can include various tools for generating generic automation scripts (e.g., RPA scripts) using sequence record data (e.g., SAP recordings). For instance the tools can include, for example, a script generator 110, a data merger 112, a screen schema generator 114, a generic script generator 116, and/or a data file generator 118. In some implementations, the tools can be presented as a screen and displayed on a GUI 142 of the user device 140 and operated by a user to send to the software bot 130 to execute a generic automation script generated by the processor 102. In other words, the generic automation script can be used by the software bot 130 to execute tasks and/or a sequence of actions of a software process (or business process) specified by the sequence record data in an automated fashion. In some implementations, the processor 102 can generate a GUI (or a screen) for each tool that is displayed on the GUI 142 of the user device 140 such that each tool can receive, via manual input, files to generate output files used to generate the generic automation script. For instance, the files can include, for example, the sequence record data (e.g., SAP recording) that includes technical details about a sequence of actions in a software process (e.g., clicking buttons, entering credentials, inputting files, etc.). The processor 102 can be caused to convert the sequence record data into a format consumable by the software bot 130 (e.g., XAML format) to execute the software process defined in the sequence record data in an automated fashion (e.g., RPA script).

The user device 140 can be or include a compute device similar in structure to the compute device 101. The user device 140 can include a memory (not shown in FIG. 1) and a processor (not shown in FIG. 1) operatively coupled to the memory of the user device 140. The memory of the user device 140 can store instructions to receive signals from the compute device 101 via the network 120 to display the tools (e.g., the script generator 110, the data merger 112, the screen schema generator 114, the generic script generator 116, the data file generator 118, etc.) on the GUI 142 of the user device 140 such that the user operating the user device 140 can interact with.

The script generator 110 can be or include a software tool configured to receive files to generate a script. The script can be generated automatically. In some implementations, the script generator 110 can be presented on the GUI 142 of the user device 140. The script generator 110 can include I/O fields enabling the user operating the user device 140 to enter and/or provide the files for the script generator 110. The files can be, for example, the sequence record data, a table database, and/or a location (or path) for the script to be generated. The table database can include a list of tables of sequences of data previously generated, stored, and/or the like. The table database can include sequence identifiers (e.g., a code) associated with the list of tables of the sequences of data. For example, the sequence identifier can be or include a code, name, value, combination of characters and numbers, and/or any identifier for the sequence record data. The sequence identifier can appear and/or be included in multiple files from the files and can be used to filter the table database for the processor 102 to extract the sequence record data (stored in the database 103) to be used to generate the script. The script generator is described further in detail in FIG. 2.

In some implementations, the script generator 110 can pull a table from the list of tables associated with a sequence identifier specified by the user. The memory 105 can store instructions to cause the processor 102 to generate, via the script generator 110, the script. For instance, the script generator 110 can be caused, via the processor 102 of the compute device 101 to extract a set of screen features associated with a set of user actions from the sequence record data. In some cases, the set of user actions can include a sequence of user actions executed during a software process. The sequence record data can include information about the set of screen features associated with the set of user actions that were recorded during the software process. The sequence record data can also include information describing the set of screen features in chronological order. The script generator 110 can also be caused, via the processor 102, to map each screen feature from the set of screen features to a table from the table database based on the sequence identifier, to generate the script. In other words, the script can include, for example, information on steps of user actions recorded in the sequence record data. The script can be used for generating the generic automation script to be consumed by the software bot 130 to execute the software process recorded in the sequence record data.

The data merger 112 can be or include a tool configured to consolidate the script to remove redundancy. In some implementations, the data merger 112 can be presented on the GUI 142 of the user device 140 with I/O fields that the user can provide inputs to the data merger 112 following the script generator 110. For instance, an input field of the data merger 112 can be designated for a set of address files associated with the sequence record data and/or the sequence identifier. An output field of the data merger 112 can be a location and/or an identifier of the location (e.g., a path) designated for a merged address tree generated by the data merger 112 using the address files as an input. In some implementations, the merged address tree outputted by the data merger 112 can be stored in the database 103. In some implementations, the memory 105 can store instructions to cause the processor 102 to generate the merged address tree by removing redundant addresses from the set of address files. For instance, the set of redundant addresses can be, for example, duplicate addresses shared within the set of address files. In some cases, the redundant addresses can include duplicate addresses associated with the sequence identifier defined by the sequence record data. For instance, the data merger 112 can combine the addresses of the set of address files and then remove redundant addresses by finding common occurrences. In some implementations, the memory 105 can store instructions to cause the processor 102 to, via the data merger 112 to generate the merged address tree based on a hierarchy. For instance, the merged address tree can include addresses structured in a hierarchy based on a configuration of screen features rendered/processed (e.g., chronologically) in the sequence recording data. The data merger 112 can be described further in detail in FIG. 2.

The screen schema generator 114 can be or include a tool configured to, via the processor 102, generate a screen schema based on the script. In some implementations, the screen schema generator 114 can be presented on the GUI 142 of the user device 140 with I/O fields that the user can provide files as inputs such as, for example, the merged address tree, the sequence record data, and/or the script. The memory 105 can store instructions to cause the processor 102 to, via the screen schema generator 114, to generate the screen schema by attempting to correlate each line in the sequence record data to each address from the merged address tree, to identify a path for each screen feature from the script based on a hierarchy of the set of screen features (extracted from the sequence record data). The memory 105 can further store instructions to cause the processor 102 to convert each address associated with each path to a dynamic address from a table of dynamic addresses, to generate the screen schema. In some implementations, the screen schema generator 114 can generate the table of dynamic addresses by comparing the sequence record data to the merged address tree, based on the hierarchy of the set of screen features from the sequence record data. The dynamic address can be used to generate a generic automation script such that the generic automation script is in a format (e.g., XAML format) compatible to be consumed by the software bot 130. In some implementations, the processor 102 can assign a ranking to each dynamic address in the table of dynamic addresses of the screen schema. The ranking can be based on the hierarchy of the set of screen features from the sequence record data. For instance, the screen schema generator 114 can assign a specific number to the dynamic address base on an occurrence of an associated address describing a screen feature. In some implementations, each dynamic address from the table of dynamic addresses includes a unique path to each screen feature from the set of screen features extracted from the sequence record data. A unique path can be, for example, a path that corresponds to an identifier unique to a screen feature as identified in the script.

In some implementations, the screen schema generator 114 can generate the screen schema without compromising stability. For instance, addresses in the merged address tree can be prone to errors as it can be dependent on a version of the GUI used in the sequence record data. In some cases, a GUI with version 7.50 can differ from a GUI with version 7.60. In some implementations, the processor 102 can insert a generic character such as, for example, "x" at the end of an address from the merged address tree to generate (or convert an address from the merged address tree) a dynamic address. The generic character can inform the screen schema generator 114 to use that address in response to any changes to a name for that address (based on SAP software updates, tool updates, GUI version updates, etc.). In some implementations, addresses in the merged address tree can be stored in an address table and can be linked to other tables based on SAP software.

In some implementations, the screen schema generator 114 can be configured to link the addresses of the merged address tree to an associated screen identifier in the script. The screen identifier can be, for example, a name and/or description of a screen feature. In some cases, the table of dynamic addresses can also include future-ready dynamic addresses for future generic automation scripts. For instance, the merged address tree can include an address such as, for example, "/app/con[0]/ses[0]/wnd[0]/tbar[0]/btn[11]." The address can be associated with an action involving a screen feature of a save button. The dynamic address converted from that address from the merged tree can be, for example, "<sap id='tbar[0]/btn[11]'>." The address from the merged address tree can include information related to GUI version, which can be updated in later versions. The "btn" can include an identifier "[11]", which can remain constant despite updates. This is so, at least in part, to inform the generic script generator 116 to maintain that the dynamic address is to be a save button. In some implementations, the dynamic nature of the screen schema can enable the screen schema to be easily readable and/or consumable by the software bot 130 to execute automated software processes from sequence record data.

In some implementations, the files can be a first set of files, the set of address files can be a first set of address files, the script can be a first script, and the merged address tree can be a first merged address tree. The memory 105 can store instructions to cause the processor 102 to automatically generate the generic automation while receiving a second set of files and generate a second merged address tree while receiving a second set of address files. The screen schema generator 114 can be described further in detail in FIG. 3.

The generic script generator 116 can be or include a tool configured to, via the processor 102, automatically generate a generic automation script based on the sequence record data and the screen schema, following the execution of the screen schema generator 114. In some implementations, the generic script generator 116 can be presented on the GUI 142 of the user device 140 with I/O fields that the user can provide inputs to the generic script generator 116 such as, for example, the sequence record data and the screen schema. In some implementations, the memory 105 can store instructions to cause the processor 102, via the generic script generator 116, to automatically generate the generic automation script by mapping a pre-defined control from a set of pre-defined controls to a user action from a set of user actions associated with the sequence record data. The generic script generator 116 can further generate the generic automation script by assigning each pre-defined control to each dynamic address from the table of dynamic addresses of the screen schema and associated with each user action from the set of user actions. For instance, the pre-defined control can be a button press mapped to the user action of clicking on a screen. The mapped control can be clicking (by the software bot) the button on the screen). As such, when the software bot 130 consumes the generic automation script for execution, the software bot 130 can automatically click the button. The generic script generator 116 can be described further in detail in FIG. 3.

In some implementations, the generic automation script can be, for example, a XAML file. In some instances, the XAML file can be in an RPA format such that the XAML file is compatible for consumption by the software bot 130. The generic automation script can be a file that the software bot 130 can use to execute the software process in the sequence record data specifying the set of user actions of the software process in an automated fashion. For instance, memory 105 can store instructions to cause the processor 102 to transmit the generic automation script to the software bot 130. The generic automation script can be transmitted via the network 120 to the software bot 130 if the software bot 130 is remotely located from the compute device 101. In some cases, the software bot 130 can be located at the compute device 101 and/or the user device 140.

The data file generator 118 can be or include a software tool configured to, via the processor 102, generate data files to be used with the generic automation script by the software bot 130. In some implementations, the data file generator 118 can be or include a screen in the sequence of screens following the execution of the generic script generator 116. The data file generator 118 can be presented within the screen of the GUI 142 to the user operating the compute device 101 with input fields that the user can provide inputs to the screen data file generator such, for example, the script and the sequence record data including the sequence identifier.

The memory 105 can store instructions to further cause the processor 102, via the data file generator 118, to automatically receive a command to generate, at runtime, a data file based on the execution (or consumption) of the generic automation script by the software bot 130. In some implementations, generating the data file can include, for example, extracting a set of field data from files based on the sequence identifier and used to execute the sequence of user actions recorded in the sequence record data, to verify that the generic automation script is associated with that sequence record data.

In some implementations, the processor 102 can also cause the data file generator 118 to automatically execute a second sequence of user actions using the generated data file using a first sequence of user actions from a first sequence record data. For instance, the data file can be, for example, data entries for screen fields (e.g., I/O fields) associated with a software process specified by the first sequence record data. The first sequence record data can include a sequence of user actions of a software process that was recorded. The user actions from the first sequence record data can include entering input data into screen fields. The data file generated can include that input data to be inputted into screen fields for the second sequence of user actions. In some cases, the second sequence of user actions can be, for example, the same (or substantially similar) to the first sequence of actions specified in the first sequence record data. The processor 102 can use the data file as inputs for the software bot 130. In some cases, the software bot 130 can use the data file as inputs for screen fields associated with the second sequence of user actions such that the generic script generator 116 can generate a second generic automation script based on the second sequence of user actions to test that the execution of the second sequence of user actions via consumption of the second generic automation script by the software bot 130 performs substantially similar to the first sequence of user actions via consumption of the first generic automation script by the software bot 130. In some cases, the processor 102 can compare an output of the generic automation script executed/consumed by the software bot 130 using the sequence record data to an output of the generic automation script executed by the software bot using the data file, to verify that the generic automation script, when consumed by the software bot 130, performs substantially similarly to the sequence of user actions specified by the sequence record data.

In some cases, the data file can be generated automatically at runtime. For instance, the data file generator 118 can generate the data file during other operations such as, for example, generating the screen schema via the screen schema generator. In other words, the data file can be generated on-the-fly (e.g., while the processor 102 is executing other tasks). For instance, the files can be a first set of files and the script can be a first script. The data file generator 118 can automatically generate the datafile while receiving a second plurality of files and/or a second script.

In some implementations, the generic script generator 116 can receive files such as, for example, a data mapping file, a data sequence file, and a source code file to generate the data file. The memory 105 can store instructions to cause the processor 102 to store the data file in the database 103 and/or a database located at the server 124. This can so, at least in part, for example to retrieve various data files stored at the server 124 to test generic automation scripts. The data file generator 118 can be described further in detail in FIG. 5

Figure 2:
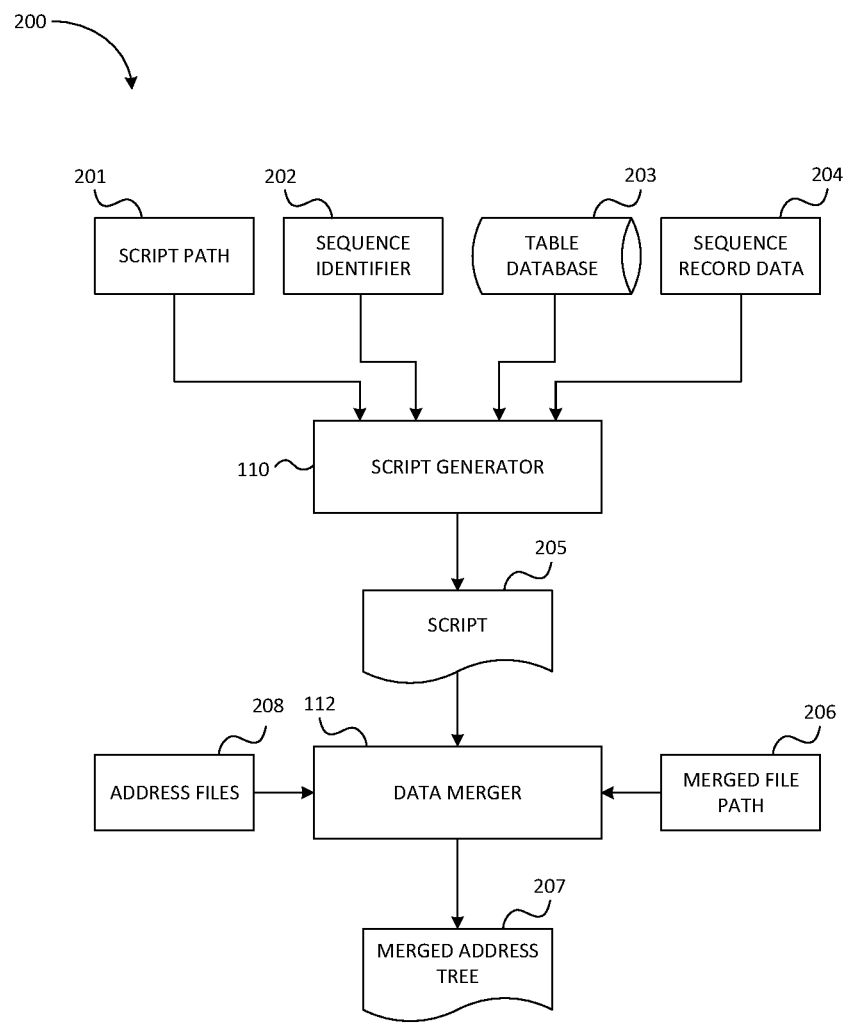
FIG. 2 is a flow diagram of a process for generating a script for automatically transforming software process recordings into dynamic automation scripts, according to an embodiment.

FIG. 2 is a flow diagram of a process 200 for generating a script 205 for automatically transforming software process recordings into dynamic automation scripts, according to an embodiment. The process 200 can be performed by a processor at a compute device (not shown in FIG. 2) or user device (not shown in FIG. 2) as described in FIG. 1. The process 200 can include receiving, at a script generator 110 from FIG. 1, inputs including, for example, a script path 201, a sequence identifier 202, a table database 203, and/or sequence record data 204. The inputs can be displayed and or inputted via screen fields. The script path 201 can be a location and/or an indicator of the location for storing the script 205 when generated. In some implementations, the script path 201 can be or include an indication of a location in a database located at server (not shown in FIG. 2) and/or the user device operated by a user and where the script 205 was generated at.

The sequence identifier 202 can be or include, for example, a code, value, identifier, and/or any combination of natural language-based characters identifying the sequence record data 204. The sequence record data 204 can include information about a set of screen features associated with a set of user actions that were recorded during a software process. The sequence record data 204 can also include information describing the set of screen features in chronological order. The script generator 110 can be configured to map each screen feature from the set of screen features to a table from the table database 203 based on the sequence identifier, 202, to generate the script 205. In other words, the script 205 can include, for example, information on steps of user actions recorded in the sequence record data 204. The script 205 can be used for generating a generic automation script to be consumed by a software bot to execute the software process recorded in the sequence record data 204. In some implementations, the table database 203 can be or include a file that contains a list of multiple sequence record data and corresponding database tables that the processor can map, based on the sequence record data 204 and/or the sequence identifier 202. In some implementations, the table database 203 can include a file in a CSV format containing multiple sequence identifiers where each sequence identifier corresponds to a table. In some instances, duplicate sequence identifiers can correspond to different tables. The table database 203 can also include the instances of the sequence identifier 202 that the script generator 110 can use to filter out tables associated with the sequence identifier 202.

The script 205 generated from the script generator 110 using the inputs data 204 can be a file containing addresses. In some implementations, the script 205 can include a file containing addresses where each address can be a mapping of screen features to a corresponding table from the table database. In other words, the script 205 can include, for example, information on steps of user actions recorded in the sequence record data 204. The script 205 can also include technical details on steps recorded in the sequence record data 204. The script 205 can be generated automatically In some implementations, generating the script 205 can include mapping screen features from the sequence record data 204 to tables from the table database 203, to produce an address tree in the script 205. For instance, the script generator 110 can map each screen feature to a table defined by the table database 203 to generate the script 205. In some implementations, the sequence identifier 202 can be or include a code, name, and/or any identifier for the sequence record data 204.

The sequence identifier 202 can appear and/or be included in multiple files from the files (e.g., the table database 203 and the sequence record data 204) and can be used by the script generator 110 to filter the table database 203 to extract the sequence record data 204 (which can be stored in a database located at a server) to be used to generate the script 205.

The process 200 can further include inputting the script 205, merged file path 206, and a set of address files 208 based on the sequence identifier 202, to a data merger 112 of FIG. 1, to generate a merged address tree 207. In some implementations, the merged address tree 207 outputted by the data merger 112 can be stored in the database located at the server. In some implementations, the data merger 112 can be configured to generate the merged address tree 207 by removing redundant addresses from the set of address files 208. For instance, the set of redundant addresses can be, for example, duplicate addresses shared within the set of address files 208. In some cases, the redundant addresses can include duplicate addresses associated with the sequence identifier 202 defined by the sequence record data. The merged file path 206 can be a location and/or an indicator of the location for storing the merged address tree 207 when generated. In some implementations, the merged file path 206 can be or include an indication of a location in the database located at server and/or the user device operated and where the merged address tree 207 was generated at.

In some implementations, the data merger 112 can combine the addresses of the set of address files 208 and then remove redundant addresses by finding common occurrences. This is so, at least in part, because addresses in the set of address files 208 and associated with the sequence record data 204 can be unstable to be converted into a generic automation script. The addresses can be used, for example, to store and manage information for various types of screen features associated with the sequence record data 204. In some cases, the addresses can be provide a location for storing and managing information about screen features used in a software process. For example, information stored in the address can be used to generate invoices, purchase orders, and other business documents, or to send emails or make phone calls to customers or vendors.

In some implementations, the data merger 112 can be configured to generate the merged address tree 207 based on a hierarchy. For instance, the merged address tree 207 can include addresses structured in a hierarchy based on a configuration of screen features rendered/processed (e.g., chronologically) in the sequence recording data 204. The merged address tree 207 can be used to map to screen features in the script 205 and/or extracted from the sequence record data 204. For instance, an address from the merged address tree 207 can be, for example, "/app/con[0]/ses[0]/ wnd[0]/tbar[0]/btn[11] btn[11] GuiButton Save (Ctrl+S)." That address can correspond to a screen feature that is, for example, "button 11."

Figure 3:
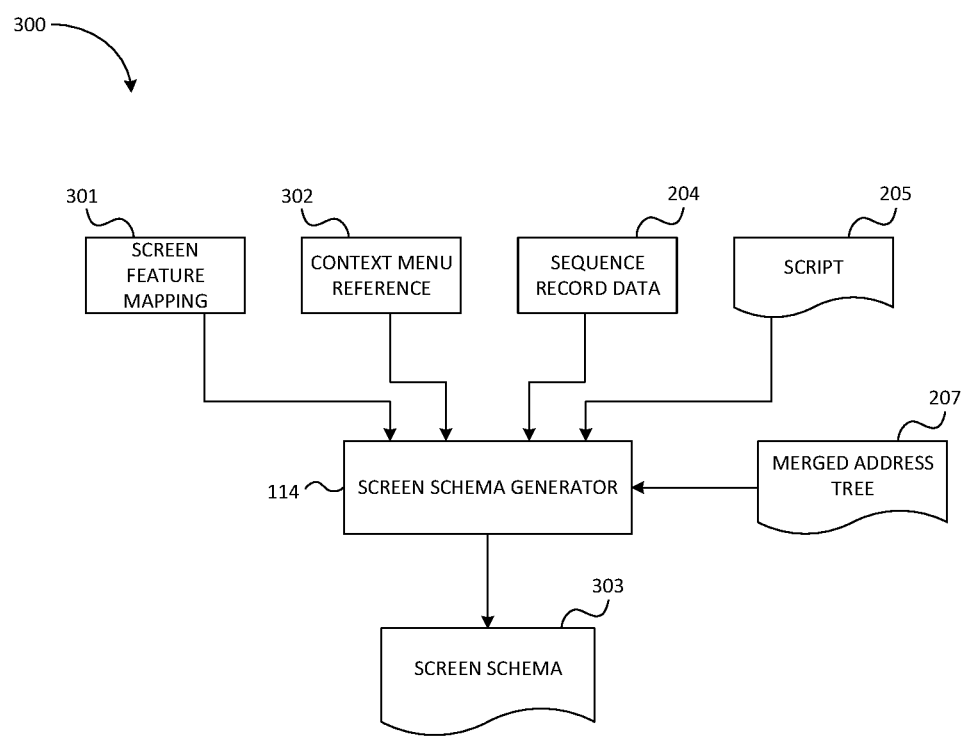
FIG. 3 is a flow diagram of a process for generating a screen schema for automatically transforming software process recordings into dynamic automation scripts, according to an embodiment.

FIG. 3 is a flow diagram of a process 300 for generating a screen schema 303 for automatically transforming software process recordings into dynamic automation scripts, according to an embodiment. The process 300 includes receiving, at a screen schema generator 114 of FIG. 1, inputs including, for example, a screen feature mapping 301, a context menu reference 302, the sequence record data 204, and the script 205. The script 205 can be generated from a script generator 110 described in FIG. 1 or FIG. 2. The sequence record data 204 can be consistent with any sequence record data as described in the entirety of this disclosure. The screen feature mapping 301 and the context menu reference 302 can include static files used for every sequence record data received, stored, and/or recorded. The static files can also include data that scripting tools do not record. In some implementations, the screen schema generator 114 can also receive an input describing a location for the screen schema 303. The screen schema 303 can be in a CSV format.

The screen schema generator 114 can be configured to generate the screen schema 303 by attempting to correlate each line in the sequence record data 204 to each address from the merged address tree 207, to identify a path for each screen feature from the script 205 based on a hierarchy of the set of screen features (extracted from the sequence record data 204). The screen schema generator 114 can be configured to convert each address associated with each path to a dynamic address from a table of dynamic addresses, to generate the screen schema 303. In some implementations, the screen schema generator 114 can generate the table of dynamic addresses by comparing the sequence record data 204 to the merged address tree 207, based on the hierarchy of the set of screen features from the sequence record data 204. The dynamic address can be used to generate a generic automation script such that the generic automation script is in a format (e.g., RPA format) compatible to be consumed by a software bot. In some implementations, the screen schema generator 114 can be configured to assign a ranking to each dynamic address in the table of dynamic addresses of the screen schema 303. The ranking can be based on the hierarchy of the set of screen features from the sequence record data 204. For instance, the screen schema generator 114 can assign a specific number to the dynamic address base on an occurrence of an associated address describing a screen feature. In some implementations, each dynamic address from the table of dynamic addresses includes a unique path to each screen feature from the set of screen features extracted from the sequence record data 204.

In some implementations, the screen feature mapping 301 and the context menu reference 302 files can compensate for missing addresses in the merged address tree 207. For instance, the screen feature mapping 301 and the context menu reference 302 files can compensate for missing addresses since standard recording tools for sequence record data (e.g., the sequence record data 204) can be limited to read screen features that are only present on a given screen. In some cases, the screen can include a screen feature of a dropdown menu such that only one value is visible. The screen feature mapping 301 and the context menu reference 302 files can be used to compensate for remaining values hidden in the dropdown menu and include those remaining values when generating, via the screen schema generator 114, the screen schema 303.

In some implementations, the screen schema generator 114 can generate the screen schema 303 without compromising stability. For instance, addresses in the merged address tree 207 can be prone to errors as it can be dependent on a version of the GUI used in the sequence record data 204. In some cases, a GUI with version 7.50 can differ from a GUI with version 7.60. In some implementations, the processor 102 can insert a generic character such as, for example, "x" at the end of an address from the merged address tree 207 to generate (or convert an address from the merged address tree 207) a dynamic address. The generic character can inform the screen schema generator 114 to use that address in response to any changes to a name for that address (based on SAP software updates, tool updates, GUI version updates, etc.). In some implementations, addresses in the merged address tree 207.

Figure 4:
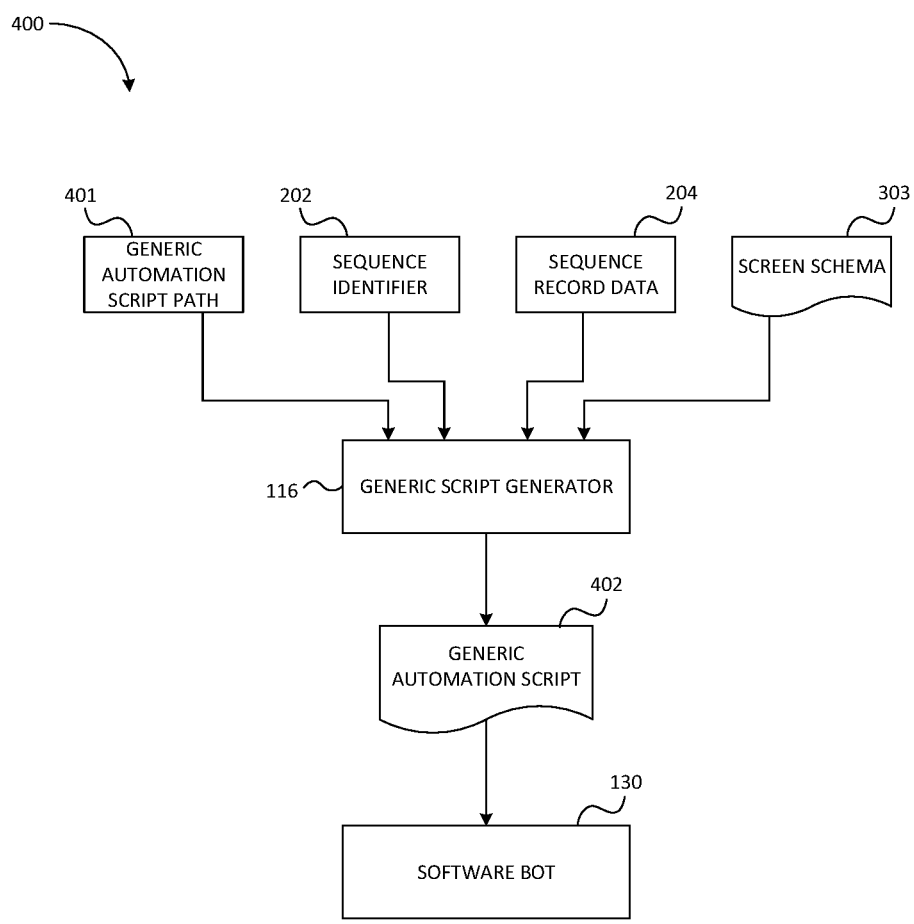
FIG. 4 is a flow diagram of a process for generating a generic automation script automatically transforming software process recordings into dynamic automation scripts, according to an embodiment.

FIG. 4 is a flow diagram of a process 400 for generating a generic automation script 402 automatically transforming software process recordings into dynamic automation scripts, according to an embodiment. The process 400 includes receiving, at the generic script generator 116 of FIG. 1, inputs including, for example, a generic automation script path 401, a sequence identifier 202, sequence record data 204, a screen schema 203 and a script 205 (or merged address tree 207), to generate the generic automation script 402. The generic automation script path 401 can be a location for the generic automation script 402. The sequence identifier 202 can be consistent with any sequence identifier as described herein. The sequence record data 204 can be consistent with any sequence record data as described herein. The screen schema 303 can be generated from the screen schema generator 114 described in FIG. 1 or FIG. 3. The generic automation script 402 can be any generic automation script as described in the entirety of this disclosure.

In some implementations, the generic script generator 116 can be configured to automatically generate the generic automation script 402 by mapping a pre-defined control from a set of pre-defined controls to a user action from a set of user actions associated with the sequence record data 204. The generic script generator 116 can further generate the generic automation script 402 by assigning each pre-defined control to each dynamic address from the table of dynamic addresses of the screen schema 303 and associated with each user action from the set of user actions. For instance, the pre-defined control can be a button press mapped to the user action of clicking on a screen. The mapped control can be, for example, clicking (by the software bot) the button on the screen). As such, when a software bot 130 consumes the generic automation script 402 for execution, the software bot 130 can automatically click the button.

In some implementations, the generic automation script 402 can be generated on the fly and/or on runtime. For instance, the generic script generator 116 can generate the generic automation script 402 while receiving a second set of files, to generate a second script and thus generate a second generic automation script. In some implementations, the generic script generator 116 can utilize a template to generate the generic automation script 402 from the sequence record data 204. The generic automation script 402 can be, for example, an XAML file. The generic automation script 402 can be a file that the software bot 130 can use to execute the software process and/or sequence of user actions specified by the sequence record data 204 in an automated fashion.

Figure 5:
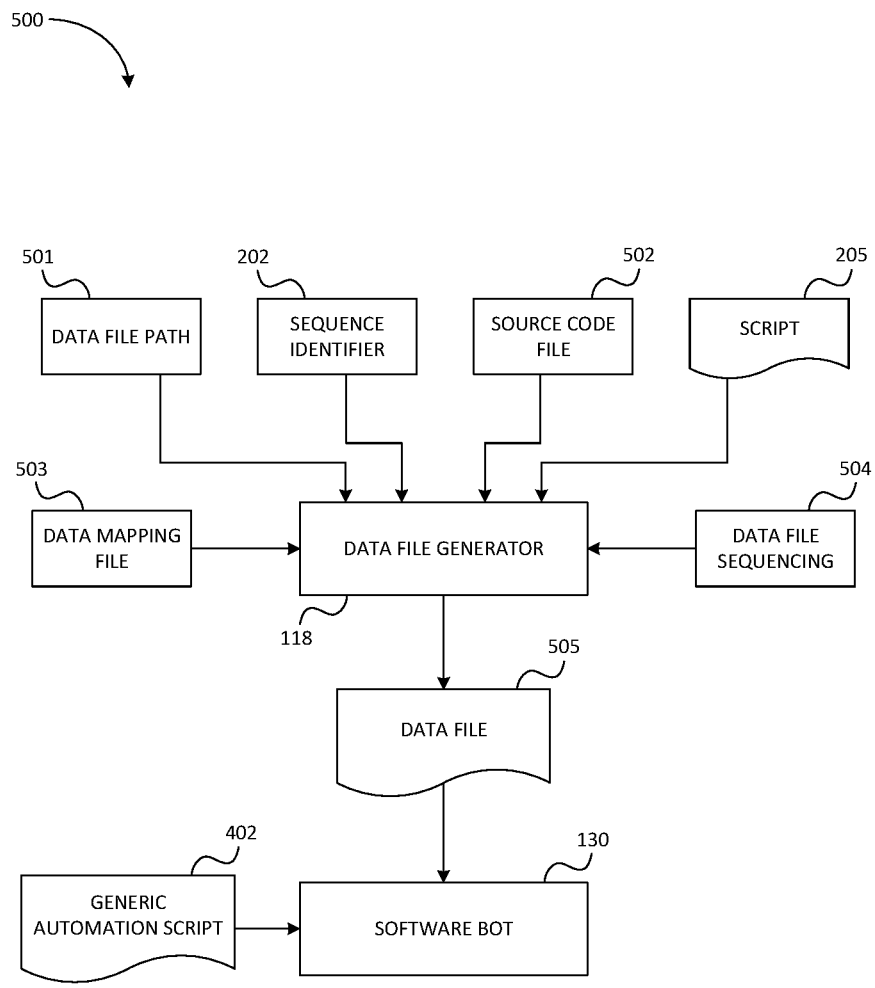
FIG. 5 is a flow diagram of a process for generating a data file for a software bot, according to an embodiment.

FIG. 5 is a flow diagram of a process 500 for generating a data file 505 for the software bot 130, according to an embodiment. The process 500 can include receiving, at the data file generator 118 of FIG. 1, files including, for example, a data mapping file 503, a data sequencing file 504, a source code file 502, a data file path 501, the sequence identifier 202, and the script 205, to generate the data file 505. The sequence identifier 502 can include any sequence identifier as described herein. The script 205 can be any script 205 as described herein. The data mapping file 503 can be a file containing mapping information between tables from a table database. The data sequencing file 504 can be a file containing technical details on how different files can be sequenced if multiple user actions are automated. The data file path 505 can be a location for the generated data file 505. The source code file 502 can be a file containing data extraction and generation logic. In some implementations, the source code file 502 can be dynamically inserted into a compute device from FIG. 1 during execution of the software bot 130. In some implementations, the data file generator 118 can identify the data file 505 (or multiple data files) to be used as test data and map the data file 505 with a format compatible with the generic automation script 402 (e.g., XAML format). The data file generator 118, can be configured to automatically receive a command to generate, at runtime, a data file 505 based on the execution (or consumption) of the generic automation script 402 by the software bot 130. In some implementations, generating the data file 505 can include, for example, extracting a set of field data from the files based on the sequence identifier 202 and used to execute a sequence of user actions recorded in the sequence record data 204 of FIG. 2, to verify that the generic automation script 402 is associated with the sequence record data 204.

In some implementations, the data file generator 118 can be configured to automatically execute a second sequence of user actions using the generated data file 505 using a first sequence of user actions from a first sequence record data. For instance, the data file 505 can be, for example, data entries for screen fields (e.g., I/O fields) associated with a software process specified by the first sequence record data. The first sequence record data can include a sequence of user actions of a software process that was recorded. The user actions from the first sequence record data can include entering input data into screen fields. The data file 505 generated can include that input data to be inputted into screen fields for the second sequence of user actions. In some cases, the second sequence of user actions can be, for example, the same (or substantially similar) to the first sequence of actions specified in the first sequence record data. In some cases, the data file 505 can be used as inputs for the software bot 130. In some cases, the software bot 130 can use the data file 505 as inputs for screen fields associated with the second sequence of user actions such that the generic script generator 116 can generate a second generic automation script based on the second sequence of user actions. This is so, at least in part, to test that the execution of the second sequence of user actions via consumption of the second generic automation script by the software bot 130 performs substantially similar to the first sequence of user actions via consumption of the first generic automation script by the software bot 130. In some cases, an output of the generic automation script 402 executed/consumed by the software bot 130 using the sequence record data can be compared to an output of the generic automation script 402 executed by the software bot using the data file 505, to verify that the generic automation script 402, when consumed by the software bot 130, performs substantially similarly to the sequence of user actions specified by the sequence record data 204.

Figure 6:
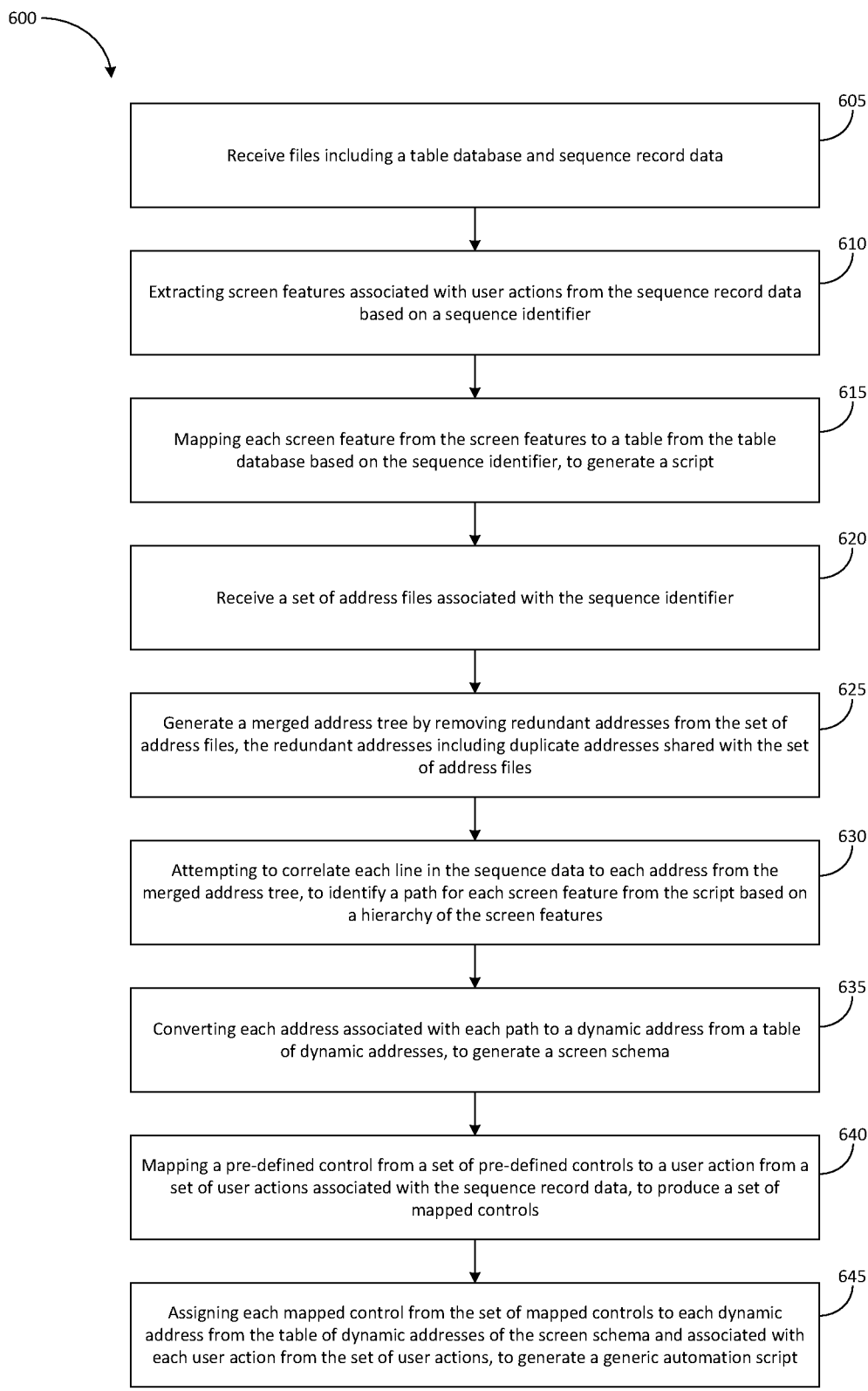
FIG. 6 is a flow diagram of a method for automatically transforming software process recordings into dynamic automation scripts, according to an embodiment.

FIG. 6 is a flow diagram of a method 600 for automatically transforming software process recordings into dynamic automation scripts, according to an embodiment. At 605, the method 600 includes receiving, at a processor of a compute device, files including a table database and sequence record data.

At 610, the method 600 includes generating, by the processor, extracting screen features associated with user actions from the sequence record data and mapping each screen feature from the screen features to a table from the table database based on a sequence identifier.

At 615, the method 600 includes mapping each screen feature from the screen features to a table from the table database based on the sequence identifier, to generate a script. In some implementations, the method 600 can include generating the script automatically via a script generator.

At 620, the method 600 includes receiving a set of address files associated with the sequence identifier. In some cases, the set of addresses can be, for example, a location for the set of screen features associated with the sequence record data. In some cases, the set of address files can include multiple instances of the same address.

At 625, the method 600 includes generating a merged address tree by removing redundant addresses from the set of address files. The redundant addresses can include duplicate addresses shared within the set of address files. In some implementations, the method 600 can include generating the merged address via a data merger. For instance, an input field of the data merger can be designated for a set of address files associated with the sequence record data and/or the sequence identifier. An output field of the data merger can be a location and/or an identifier of the location (e.g., a path) designated for a merged address tree generated by the data merger using the address files as an input. In some implementations, the merged address tree outputted by the data merger can be stored in a database. For instance, the set of redundant addresses can be, for example, duplicate addresses shared within the set of address files. In some cases, the redundant addresses can include duplicate addresses associated with the sequence identifier defined by the sequence record data. In some implementations, the method 600 can include combining the addresses of the set of address files and then removing redundant addresses by finding common occurrences. In some implementations, the method 600 can include generating the merged address tree based on a hierarchy. For instance, the merged address tree can include addresses structured in a hierarchy based on a configuration of screen features rendered/processed (e.g., chronologically) in the sequence recording data. In some implementations, the method 600 can include generating the merged address tree via a data merger.

At 630, the method 600 includes attempting to correlate each line in the sequence record data to each address from the merged address tree, to identify a path for each screen feature from the script based on a hierarchy of the plurality of screen features.

At 635, the method 600 includes converting the of addresses in the hierarchical address tree of the merged address tree to dynamic addresses, to generate a table of dynamic addresses, to produce a screen schema. Generating the screen schema can include generating the table of dynamic addresses. In some implementations, the method 600 can include generating the table of dynamic addresses by comparing the sequence record data to the merged address tree, based on the hierarchy of the set of screen features from the sequence record data. The dynamic address can be used to generate a generic automation script such that the generic automation script is in a format compatible to be consumed by a software bot. In some implementations, the method 600 can include assigning a ranking to each dynamic address in the table of dynamic addresses of the screen schema. The ranking can be based on the hierarchy of the set of screen features from the sequence record data. For instance, the method 600 can include assigning a specific number to the dynamic address base on an occurrence of an associated address describing a screen feature. In some implementations, each dynamic address from the table of dynamic addresses includes a unique path to each screen feature from the set of screen features extracted from the sequence record data. A unique path can be, for example, a path that corresponds to an identifier unique to a screen feature as identified in the script. In some implementations, the method 600 can include generating the screen schema via a screen schema generator.

At 640, the method 600 includes mapping a pre-defined control to a user action from a set of user actions associated with the sequence data, to produce a mapped control from a set of mapped controls. For instance, the pre-defined control can be a button press mapped to the user action of clicking on a screen. The mapped control can be clicking (by the software bot) the button on the screen).

At 645, the method 600 includes assigning each mapped control from the set of mapped controls to each dynamic address from the table of dynamic addresses of the screen schema and associated with each user action from the set of user actions, to generate a generic automation script. For instance, the pre-defined control can be a button press mapped to the user action of clicking on a screen. The mapped control can be clicking (by the software bot) the button on the screen). As such, when the software bot consumes the generic automation script for execution, the software bot can automatically click the button. In some implementations, the method 600 can include automatically generating the generic automations script via a generic script generator.

It is to be noted that any one or more of the aspects and embodiments described herein can be conveniently implemented using one or more machines (e.g., one or more compute devices that are utilized as a user compute device for an electronic document, one or more server devices, such as a document server, etc.) programmed according to the teachings of the present specification. Appropriate software coding can readily be prepared by skilled programmers based on the teachings of the present disclosure. Aspects and implementations discussed above employing software and/ or software modules can also include appropriate hardware for assisting in the implementation of the machine executable instructions of the software and/or software module.

Such software can be a computer program product that employs a machine-readable storage medium. A machine-readable storage medium can be any medium that is capable of storing and/or encoding a sequence of instructions for execution by a machine (e.g., a compute device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software can also include information (e.g., data) carried as a data signal on a data carrier, such as a carrier wave. For example, machine-executable information can be included as a data-carrying signal embodied in a data carrier in which the signal encodes a sequence of instruction, or portion thereof, for execution by a machine (e.g., a compute device) and any related information (e.g., data structures and data) that causes the machine to perform any one of the methodologies and/or embodiments described herein.

Examples of a compute device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a compute device can include and/or be included in a kiosk.

All combinations of the foregoing concepts and additional concepts discussed herewithin (provided such concepts are not mutually inconsistent) are contemplated as being part of the subject matter disclosed herein. The terminology explicitly employed herein that also can appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments can be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments cannot have been presented for a specific portion of the innovations or that further undescribed alternate embodiments can be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments can be utilized and functional, logical, operational, organizational, structural and/or topological modifications can be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For example, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general-purpose processor, a central processing unit (CPU), a microprocessor, a digital signal processor (DSP), a controller, a microcontroller, a state machine and so forth. Under some circumstances, a "processor" can refer to an application specific integrated circuit (ASIC), a programmable logic device (PLD), a field programmable gate array (FPGA), etc. The term "processor" can refer to a combination of processing devices, e.g., a combination of a DSP and a microprocessor, multiple microprocessors, one or more microprocessors in conjunction with a DSP core or any other such configuration.

The term "memory" should be interpreted broadly to encompass any electronic component capable of storing electronic information. The term memory can refer to various types of processor-readable media such as random-access memory (RAM), read-only memory (ROM), non-volatile random-access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement (s). For example, the terms "instructions" and "code" can refer to one or more programs, routines, sub-routines, functions, procedures, etc. "Instructions" and "code" can comprise a single computer-readable statement or many computer-readable statements.

The term "modules" can be, for example, distinct but interrelated units from which a program may be built up or into which a complex activity may be analyzed. A module can also be an extension to a main program dedicated to a specific function. A module can also be code that is added in as a whole or is designed for easy reusability.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts can be embodied as one or more methods, of which at least one example has been provided. The acts performed as part of the method can be ordered in any suitable way. Accordingly, embodiments can be constructed in which acts are performed in an order different than illustrated, which can include performing some acts simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

In addition, the disclosure can include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein can be implemented in a manner that enables a great deal of flexibility and customization as described herein.

All definitions, as defined and used herein, should be understood to control over dictionary definitions, definitions in documents incorporated by reference, and/or ordinary meanings of the defined terms.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus, comprising:
    a processor; and
    a memory operatively coupled to the processor, the memory storing instructions to cause the processor to:
        receive a plurality of files including a table database and sequence record data;
        extract a plurality of screen features associated with a plurality of user actions from the sequence record data based on a sequence identifier;
        map each screen feature from the plurality of screen features to a table from the table database based on the sequence identifier, to generate a script;
        generate a merged address tree including a plurality of addresses associated with the sequence record data;
        generate a screen schema based on the script by converting each address from the merged address tree and associated with each screen feature into a dynamic address to produce a table of dynamic addresses; and
        automatically generate a generic automation script based on the sequence record data and the screen schema, the generic automation script configured to be executed by a software bot.

2. The apparatus of claim 1, wherein the instructions to automatically generate the generic automation script further include instructions to cause the processor to:
    map a pre-defined control from a plurality of pre-defined controls to a user action from a plurality of user actions associated with the sequence record data; and
    assign each pre-defined control from the plurality of pre-defined controls to each dynamic address from the table of dynamic addresses of the screen schema and associated with each user action from the plurality of user actions.

3. The apparatus of claim 1, wherein the instructions to automatically generate the generic automation script further includes instructions to cause the processor to replace each dynamic address from the table of dynamic addresses with generic code associated with each pre-defined control from the plurality of pre-defined controls.

4. The apparatus of claim 1, wherein the instructions further include instructions to cause the processor to assign a ranking to each dynamic address from the table of dynamic addresses.

5. The apparatus of claim 1, wherein each dynamic address from the table of dynamic addresses includes a unique path to each screen feature from the plurality of screen features.

6. The apparatus of claim 1, wherein the instructions further include instructions to cause the processor to generate each dynamic address from the table of dynamic addresses of the screen schema by comparing the sequence record data to the merged address tree based on a hierarchy of the plurality of screen features.

7. The apparatus of claim 1, wherein:
the plurality of files is a first plurality of files;
the script is a first script; and
the instructions to automatically generate the generic automation script further include instructions to cause the processor to automatically generate the generic automation script while receiving a second plurality of files.

8. The apparatus of claim 1, wherein the instructions to generate the script further include instructions to generate the script automatically.

9. A non-transitory, processor-readable medium storing instructions to cause a processor to:
receive a plurality of files including a table database and sequence record data;
extract a plurality of screen features associated with a plurality of user actions from the sequence record data based on a sequence identifier;
map each screen feature from the plurality of screen features to a table from the table database based on the sequence identifier, to generate a script;
receive a plurality of address files associated with the sequence identifier;
generate a merged address tree by removing a plurality of redundant addresses from the plurality of address files, the plurality of redundant addresses including a plurality of duplicate addresses shared within the plurality of address files;
attempting to correlate each line in the sequence record data to each address from the merged address tree, to identify a path for each screen feature from the script based on a hierarchy of the plurality of screen features;
convert each address associated with each path to a dynamic address from a table of dynamic addresses, to generate a screen schema;
map a pre-defined control from a plurality of pre-defined controls to a user action from a plurality of user actions associated with the sequence record data, to produce a plurality of mapped controls; and
assign each mapped control from the plurality of mapped controls to each dynamic address from the table of dynamic addresses of the screen schema and associated with each user action from the plurality of user actions, to automatically generate a generic automation script.

10. The non-transitory, processor-readable medium of claim 9, wherein the instructions to automatically generate the generic automation script further includes instructions to cause the processor to replace each dynamic address from the table of dynamic addresses with generic code associated with each pre-defined control from the plurality of pre-defined controls.

11. The non-transitory, processor-readable medium of claim 9, wherein the instructions further include instructions to cause the processor to assign a ranking to each dynamic address from the plurality of dynamic addresses.

12. The non-transitory, processor-readable medium of claim 9, wherein each dynamic address from the table of dynamic addresses includes a unique path to the screen feature from the plurality of screen features.

13. The non-transitory, processor-readable medium of claim 9, wherein the instructions to cause the processor to generate the screen schema includes instructions to further cause the processor to replace an identifier in each address from the merged address tree with a generic character, to maintain stability for the table of dynamic addresses.

14. The non-transitory, processor-readable medium of claim 9, wherein:
the plurality of files is a first plurality of files;
the plurality of address files is a first plurality of address files;
the script is a first script;
the merged address tree is a first merged address tree; and
the instructions to automatically generate the generic automation script further include instructions to cause the processor to automatically generate the generic automation script while receiving a second plurality of files; and
generate a second merged address tree while receiving a second plurality of address files.

15. An apparatus comprising:
a processor located at a server; and
a memory operatively coupled to the processor, the memory storing instructions to cause the processor to:
receive a plurality of files including a script and sequence record data;
generate a screen schema based on the script, the screen schema including a table of dynamic addresses associated with the sequence record data;
automatically generate a generic automation script from the screen schema based at least on a sequence identifier by mapping a pre-defined control from a plurality of pre-defined controls to a user action from a plurality of user actions associated with the sequence record data;
transmit the generic automation script to a software bot to be executed; and
automatically receive a command to generate, at runtime, a data file based on the execution of the generic automation script by extracting a plurality of field data from the plurality of files based on the sequence identifier and used to execute a sequence of user actions recorded in the sequence record data, to verify that the generic automation script is associated with the sequence record data.

16. The apparatus of claim 15, wherein the instructions further include instructions to cause the processor to automatically execute a second sequence of user actions using the data file as an input for a plurality of screen features associated with the sequence of user actions.

17. The apparatus of claim 15, wherein the plurality of files further include (1) a data mapping file, (2) a data sequencing file, and (3) a source code file, the plurality of files used to generate the data file.

18. The apparatus of claim 15, wherein the instructions further include instructions to cause the processor to automatically generate the data file at runtime.

19. The apparatus of claim 15, wherein the data file is configured to be used as an input for a software bot to test the generic automation script.

20. The apparatus of claim 15, wherein the instructions include instructions to verify the data generic automation script by comparing an output of the generic automation script executed by a software bot using the sequence record data to an output of the generic automation script executed by the software bot using the data file.

* * * * *